Figure 1:
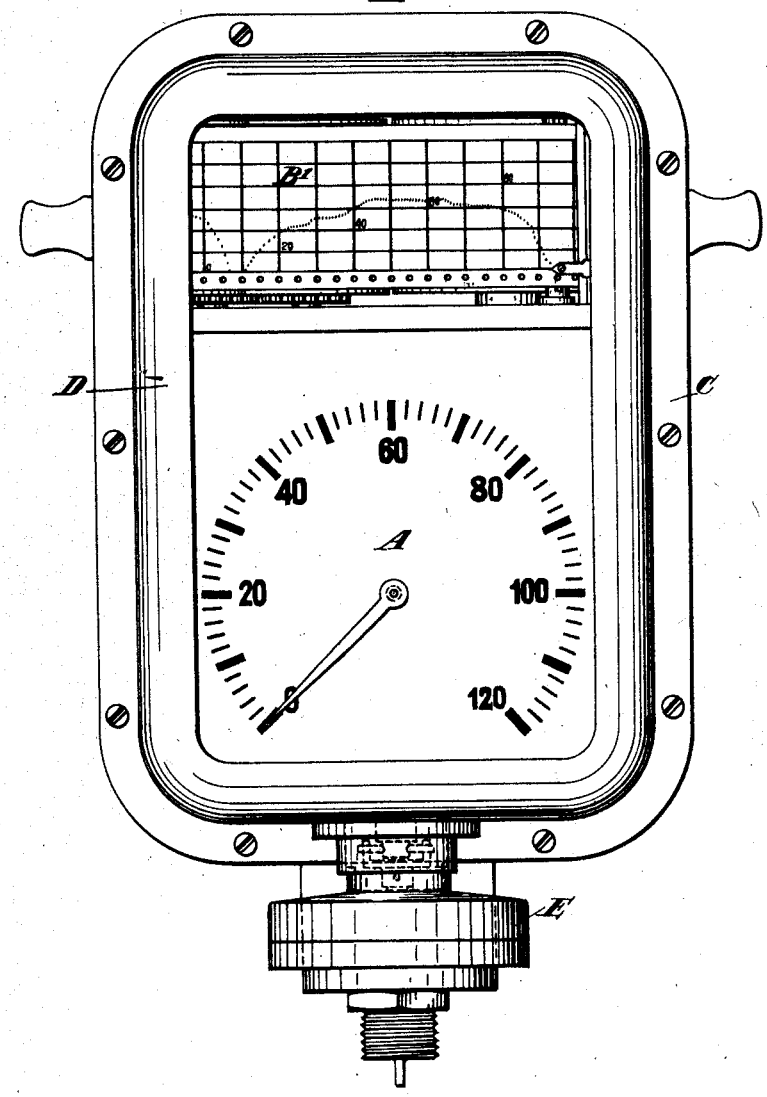

F. W. G. BRUHN.
SPEED RECORDER FOR VEHICLES OR LOCOMOTIVES.
APPLICATION FILED MAR. 20, 1920.

1,385,342.

Patented July 19, 1921.
3 SHEETS—SHEET 2.

Inventor.
Friedrich W. G. Bruhn.

F. W. G. BRUHN.
SPEED RECORDER FOR VEHICLES OR LOCOMOTIVES.
APPLICATION FILED MAR. 20, 1920.

1,385,342.

Patented July 19, 1921.
3 SHEETS—SHEET 3.

UNITED STATES PATENT OFFICE.

FRIEDRICH WILHELM GUSTAV BRUHN, OF WILMERSDORF, NEAR BERLIN, GERMANY.

SPEED-RECORDER FOR VEHICLES OR LOCOMOTIVES.

1,385,342.　　　　　Specification of Letters Patent.　　Patented July 19, 1921.

Application filed March 20, 1920. Serial No. 367,523.

*To all whom it may concern:*

Be it known that I, FRIEDRICH WILHELM GUSTAV BRUHN, a citizen of Germany, residing at Wilmersdorf, near Berlin, Germany, have invented certain new and useful Improvements in Speed-Recorders for Vehicles or Locomotives, for which I filed applications in Germany, January, 13, 1919, in Denmark, June 28, 1919, and in Switzerland, May 19, 1919; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a recording device intended for supervising vehicles and more particularly locomotives.

In known apparatus the paper tape on which the record is made is either continually moved by a clockwork that operates in conformity with the time of the day or by a clockwork which acts only while the vehicle is traveling and then for a brief interval after each stoppage of the vehicle, or it is moved forward in accordance with the distance covered and stops at each halt of the vehicle.

Apparatus in which the recording tape is moved in conformity with the progress of the hour are objectionable in that the clock which drives the paper tape on which the time is marked, must always be made to coincide with the real time of the day if reliable records are desired. A recording tape arranged in this way is also disadvantageous on account of the large amount of paper consumed through the clock having to be kept continuously going. Another serious disadvantage of this arrangement is that in cases where subsequent investigations have to be made it makes it very difficult to determine the speed at which the vehicle or locomotive traveled at a certain spot or short section of the track.

Apparatus in which the recording tape is moved by a clockwork only while the vehicle is traveling and for a brief interval after each stoppage of the same, although offering the advantage of a low paper consumption, possess the serious drawback of rendering the looking up of certain portions or spots along the track still more difficult than in apparatus giving the times of the day.

The known apparatus in which the forward movement imparted to the recording tape was proportional to the distance covered by the locomotive produced records the interpretation of which was troublesome inasmuch as the various sections of the track or journey were not readily distinguishable on account of the indications of the stops or stations being comparatively difficult to interpret or because these indications were omitted.

The object of this invention is to remove all of these drawbacks and this is accomplished by an improved device in which, in addition to the amount of paper tape that is fed forward during the travel of the vehicle being proportional to the distance covered, the further new feature among others is that the recording is performed by a metal pin actuated by the speedometer, the said pin resembling a needle and being pressed against the recording tape composed of tracing paper, thus making impressions which show the speed of travel at which the particular sections of the track were covered. If desired the pin may be arranged to be flung against the paper whenever a certain new section of track has been passed, the speed diagram thus being made up of points impressed on the paper. In this way a diagram is produced which only requires a small quantity or length of paper and enables an accurate determination of any point along the track to be made by counting the number of imprinted points. Since the distance between points in the direction of movement of the tape never changes, the points may be made to follow one another very closely, say at intervals of only about ½ millimeter, without incurring the risk of cutting the paper, which is liable to occur at slow speeds of travel when impression pins are employed that act whenever a certain interval of time has elapsed.

In accordance with the invention the amount of recording tape that is fed forward during the journey is proportional to the distance covered as in certain known types of apparatus. The forward feed mechanism is arranged to coöperate with a second driving mechanism of a known kind which shifts on a certain length of tape for every equal interval of time. The coöperation of these mechanisms is such that the amount of tape paid out while traveling is proportional to the distance covered, and the amount paid out during stoppages of the vehicle is proportional to the length of time that elapses while stopping. The latter feed motion is produced with the aid of a clockwork upon which the task of shifting forward the tape devolves as soon as the distance feed mechanism moves at a lower speed than the clockwork that is connected to the tape shifting mechanism by pawls. By this improved coöperation of the two known feeding mechanisms the possibility is obtained of readily ascertaining from the length of the tape paid out not only the distances covered but also the durations of the stops.

The speed at which the recording tape is moved by the clockwork is made equal to the speed at which it is shifted at the lowest recorded speed of travel of the locomotive.

As a result of the feed motion of the recording apparatus being proportional to the covered distance and to the duration of the halts a true reproduction on a reduced scale of the whole journey—including the halts—is obtained. By this means the marks forming the record are rendered capable of a ready and rapid interpretation; any desired points in the distances covered can be found with the aid of an ordinary measure such as a foot rule.

The registration of the traveling and halting times results in no unnecessary waste of paper because in cases of long stops of the locomotive the feed of the paper is interrupted automatically. The paper tape is always fully utilized and the renewals of the same which are not often necessary may be made at any time of the day. Setting of the clock, etc., is thus obviated.

Since the feed motion of the recording tape during actual traveling is produced by the vehicle itself, and by the clockwork only during the comparatively short stops, the clockwork is relieved of a large portion of the load.

In the drawing a constructional form of the invention is shown in which the measurement and recording of the speed of travel is performed by a speedometer with an intermittently actuated pointer.

Figure 2:
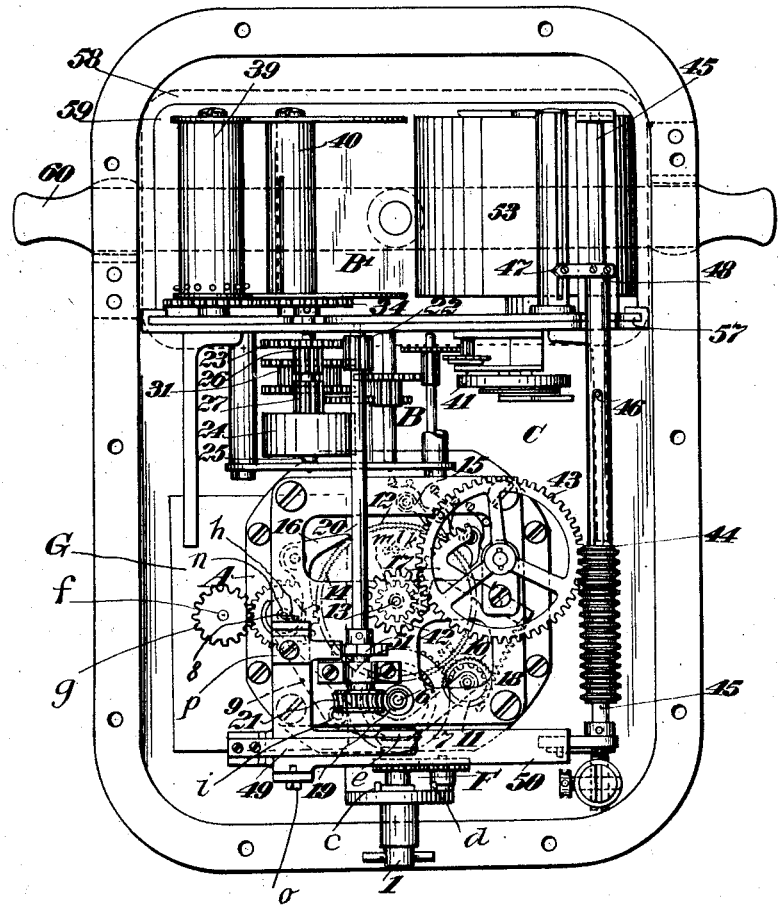
Figure 3:
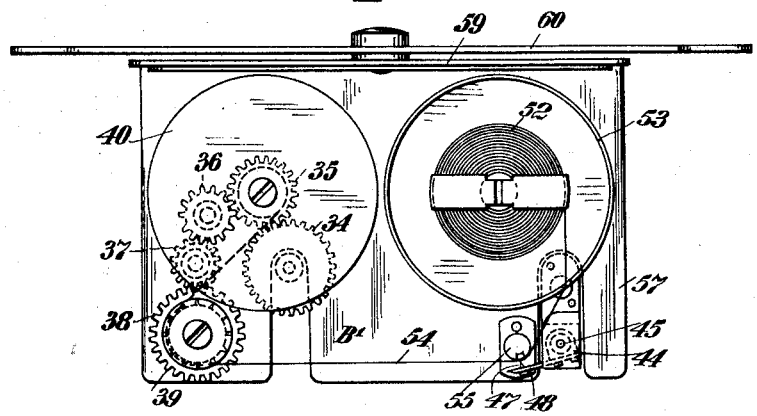

Fig. 1 is a front elevation of a closed apparatus,

Fig. 2 a front view of the entire mechanism of the opened apparatus,

Fig. 3 a plan view of the paper feed mechanism slipped out of the apparatus and

Figure 4:
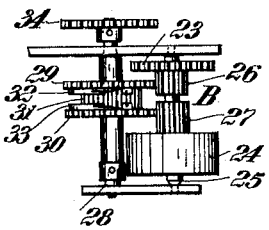
Figure 5:
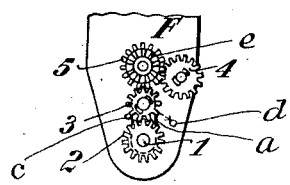
Figure 5:

Figs. 4 and 5 are details of the mechanism.

The apparatus consists of two individual and independent mechanisms, the measuring mechanism A and the recording mechanism B' each of which may be constructed as a separate unit. The mechanisms are mounted on a common plate C which also forms the rear wall of the apparatus casing D.

The measuring apparatus A consists of a positively driven speedometer which is constructed and operates as follows:

By a flexible shaft or the like the rotation of the locomotive wheel that drives the apparatus is transferred to a speed changing gear (not shown) which is located in the driving gear casing E and whose ratio of transmission may be readily adapted to the circumference of any particular locomotive wheel by changing a cog-wheel or the like.

The revolutions of the shaft 1 coupled with the speed changing gear are transferred through a unidirectional mechanism F, Fig. 5 consisting of the toothed wheels 2, 3, 4 and 5 to the measuring shaft 6 in such a manner that the shaft 6 is always turned in the same direction. Any well known unidirectional mechanism may be used, that illustrated consisting of pinion 2 on the main driving shaft 1, an intermediate wheel 3 that is mounted on a plate $a$ capable of swinging about shaft 1, and stop pins $c$ and $d$ for said plate. The wheel 3 meshes with a pinion 5 on a bevel driving gear $e$. The pinion 5 also meshes with an idler 4 that is in the path of the intermediate wheel 3. Upon reversal of travel direction plate $a$ swings from the position shown in Fig. 5 against stop-pin $d$, thus causing wheel 3 to mesh with idler 4 to drive the pinion 5. The toothed wheel 7 mounted on the shaft 6 performs two functions one of which is to drive the pointer actuating gear and the other being the winding of the measuring clockwork of any type customarily used in speed measurers, located in the casing G whose office is to couple the pointer actuating gear at certain times to the driving shaft.

The clockwork has a continuously rotating shaft $f$ provided with a gear wheel $g$ that drives a gear wheel $h$ on a control or cam shaft 8 whose speed of rotation is consequently constant. The rocking coupling lever 9 pivoted at $i$ actuated by the cam shaft 8 has a coupling wheel 10 pivoted on its right end which is kept constantly rotating by an intermediate wheel 11 that is in mesh with the driving wheel 7. Due to the rocking motion imparted by the cam shaft to the coupling lever 9, the coupling wheel 10 is intermittently coupled with the pointer actuating wheel 12, each coupling period lasting for ½ a second. This results in the actuating-wheel 12 being caused to execute a partial turn at a speed corresponding to the speed of rotation of the motor or driving shaft. The said partial turn is transferred by a carrier pin $k$ on the wheel 12 striking a pin *l* to advance the actuating wheel 14 of the pointer of the apparatus. Both of these rotary movements, that of the actuating-wheel and that of the pointer, are executed in opposition to the action of a restoring spring, holding members or pawls being also provided which prevent premature return movements of the wheel and pointer. Like the coupling lever these holding members are controlled by the cam shaft 8, which in brief and precisely equal intervals governs the working and measuring action of the apparatus that consists in the said coupling and uncoupling functions and in the holding (or locking) and releasing of the actuating wheel and pointer.

At the beginning of the measuring operation the actuating-wheel 12 is positively coupled by the coupling wheel 10 to the driving wheel 7 rotated by the driving shaft 1. The actuating wheel 12 whose initial position is determined by a fixed stop then commences rotating at a speed corresponding to the particular speed of travel of the vehicle or locomotive and in so rotating it carries the pointer locking wheel 14 mounted on the pointer shaft 13 around with it by means of carrier pins *k* and *l*. At the end of the measuring interval, which lasts a half a second, the coupling wheel 10 is rocked out of engagement with the actuating wheel. Due to the locking action of the holding pawls 15 the actuating wheel at first remains in the position into which it has been moved at the end of the measuring interval. Immediately after the actuating wheel is uncoupled the holding pawl 16, which retains the pointer in any position in which it may have previously been set, is caused to release the pointer so as to permit it to turn backward into the new position of the actuating wheel in case the speed of travel is slower than that measured in the previous $\frac{1}{2}$ second interval of measurement. This return movement is accomplished through a pinion *m* connected to the pointer wheel 14 engaged by a segment 17 under the action of a spring 18. After the pointer has again been locked in the position corresponding to that into which the actuating wheel was turned the cam shaft releases the actuating wheel 12 by means of a releasing lever (not shown). The wheel 12 then flies back into its initial position by a restoring spring and is then coupled afresh with the driving wheel 7. The operations described are repeated until the driving shaft 1 comes to a standstill, when the pointer is caused to return to its zero position by the action of a restoring spring 18 which coöperates with a toothed segment 17.

The recorder gearing (B) is driven by a worm 19 which is arranged upon the shaft 6 and which engages with a worm wheel 21 mounted on the shaft 20. A pinion 22 revolves with the shaft 20, the pinion being in mesh with a toothed wheel 23 which is fixed on a shaft 25 carrying a spring-box 24. The wheel 23 winds up the rubbing spring which is situated in the spring-box and whose inner end is fixed to the shaft 25, while its outer end commences slipping in the box and rubbing against its interior as soon as its tension exceeds a certain degree.

The toothed wheel 23 is fixed to a pinion 26 while the spring-box 24 is fixed to another pinion 27, these pinions being in mesh with toothed wheels 29 and 30 (Fig. 4) that turn loosely on the shaft 28. Arranged between the toothed wheels 29 and 30 is a ratchet wheel 31 with fine teeth which is fixed on the shaft 28. Two pawls 32 and 33 which operate in the same direction engage with the teeth of the ratchet wheel 31, the one pawl 32 being attached to the wheel 29 and the other to the wheel 30. Fixed on the shaft 28 is another wheel 34 which drives the recording tape feed mechanism that consists of the transmission wheels 35 to 38 (Fig. 3), the feed shaft 39, and the reel 40.

This feed mechanism by which the recording tape is shifted forward operates as follows:

As long as the locomotive is moving, an amount of the recording tape is unreeled by the feed shaft 39 which is proportional to the distance traveled, because the driving action of the shaft 29 is faster than that of the wheel 30 which is turned by the spring-box. But as soon as the locomotive stops and the driving wheel 29 comes to a standstill or moves slower than a certain speed (about 1¼ to 2 yards per second) the feed motion of the recording tape is continued for a certain time, say an hour, with the aid of the ratchet 31 and pawl 33 by means of a clockwork governed by an escapement 41.

The device for recording the speed of travel at any instant consists of a metal pin 47 which prints clear easily read impressions on the tape of copying paper used for recording. In the constructional form shown the pin forms a part of a periodically actuated impressing or pricking device which records the speeds in the form of a curve composed of impressed dots. The writing device is actuated by the pointer shaft 13 of the speedometer. For speed recording purposes a toothed wheel 42 is arranged upon the pointer shaft 13 of the speed measuring device, the wheel 42 meshing with a wheel 43 which, in turn, engages with the circular teeth of a vertical furrowed rack-like sleeve 44. The sleeve 44 is mounted so as to slide easily on a guide rod 45. By means of a pin 46 protruding into a guiding slot in the upper smooth part of the sleeve 44 partial turns of the rod 45 are imparted to the sleeve. The purpose of these partial turns is to periodically move the arm 48, which is fixed to the upper end of the sleeve and carries a writing needle 47, toward the paper tape. The periodical movement is produced with the aid of a striking device 50 that is influenced by a spring 49 and is actuated by a cam disk 51 arranged on the shaft 20 that operates a projection *p* on the member 50.

By reason of the engagement of its circular teeth with the toothed wheel 43 that is turned from the pointer shaft of the speedometer the furrowed sleeve 44 is raised more or less according to the position of the pointer and thus the printing or impressing needle 47 is brought into a position relative to the divisions on the recording tape or band that corresponds at each moment to the speed of travel. Seeing that the rod 46 which carries the sleeve 44 is affected through the medium of the cam disk 51 by the shaft 6 driven by the locomotive wheel, the impressing needle is flung at certain short intervals, say at every fifty yards, against the recording tape, so that a curve which appears as a practically unbroken line to the eye is produced which renders it possible to obtain exact information on any occurrences—such as the employment of brake—by counting the impressions which the needle has made. To make its impressions conspicuous the recording tape 52 which is reeled upon the casing or barrel 53 and passed through a slot in this barrel, is made to pass over a grooved guide pin 55 whose position is such that the printed portion of the tape occupies the whole of the inspection opening that extends almost across the entire breadth of the apparatus. In many cases it will suffice to keep the needle constantly gently pressed against the copying paper tape instead of flinging it against the tape intermittently. The needle then produces a fine, very distinct white line. In such cases the above described needle-flinging-device is omitted.

To make the renewing of the recording tape specially easy and convenient the arrangement is such that the part of the recording gearing which effects the feed movement of the tape can be pulled out of the apparatus. To this end the feed mechanism is mounted on a plate 57, which is slipped into grooves 56 and to which the cover 59 (Fig. 3) that closes the opening 58 (Fig. 2) in the casing is fixed. The cover is secured in its closing position by a bar 60 and a lead seal (not shown).

In order that the speed at which the speedometer is driven may always perfectly conform to the tire circumference of the driving locomotive wheel an exchangeable speed changing gear is arranged between the driving device and the apparatus, the speed changing gear being inclosed in a special casing E. This casing E is not permanently fixed to the recording apparatus but is supported by a holder which also serves as a support for the recorder. The connection between the speed changing gear in the casing and the recording apparatus is made by a loose carrier coupling so as to enable the recording apparatus to be easily removed from the locomotive when the recording tape is to be renewed. To enable the apparatus to be conveniently carried it is provided with a leather handle.

I claim:

1. In a device for recording the speed of travel of a vehicle, a recording tape, a tape feed mechanism for moving the tape, a primary driving means adapted to impart an amount of movement to the tape feed mechanism that is proportional to the distance covered by the vehicle, a secondary driving means, a transferring means for transferring the drive of the tape feed mechanism from the primary driving means to the secondary driving means whenever the speed of travel sinks below a certain limit, an impressing needle for making impressions on the said recording tape, a speed indicator adapted to be driven by the primary driving means, and intermediate gear between the speed indicator and the impressing needle for moving the needle in accordance with the movements of the indicator.

2. In a device for recording the speed of travel of a vehicle, a recording tape, a tape feed mechanism for moving the tape, a primary driving means adapted to impart an amount of movement to the tape feed mechanism that is proportional to the distance covered by the vehicle, a secondary driving means, a transferring means for transferring the drive of the tape feed mechanism from the primary driving means to the secondary driving means whenever the speed of travel sinks below a certain limit, an impressing needle for making impressions on the said recording tape, a speed indicator adapted to be driven by the primary driving means, intermediate gear between the speed indicator and the impressing needle for moving the needle in accordance with the movements of the indicator, a rocking means for rocking the said needle toward and away from the recording tape, and an actuating means attached to the said primary driving means and adapted to actuate the rocking means at certain intervals of motion of the primary driving means, substantially as described.

3. In a device for recording the speed of travel of a vehicle, a recording tape, a tape feed mechanism for moving the tape, a primary driving means adapted to impart an amount of movement to the tape feed mechanism that is proportional to the distance covered by the vehicle, a secondary driving means, a transferring means for transferring the drive of the tape feed mechanism from the primary driving means to the secondary driving means whenever the speed of travel sinks below a certain limit, a speed indicator adapted to be driven by the primary driving means, a shaft extending across the said recording tape, a slotted sleeve with circular teeth loosely mounted on the said shaft, an impressing needle for making impressions on the said recording tape, said needle being fixed on the said sleeve at a point opposite to the said tape, a toothed wheel attached to the speed indicator and engaging with the circular teeth of the said sleeve, a rocking means attached to the said shaft, a pin in the said shaft protruding into the slot in the sleeve, and a cam actuated by the said primary driving means, the cam being adapted to actuate the rocking means at certain intervals of the distance covered, whereby the said needle is flung at certain intervals against the recording tape.

4. In a device for recording the speed of travel of a vehicle, a recording tape, a tape feed mechanism for moving the tape, a primary driving means adapted to impart an amount of movement to the tape feed mechanism that is proportional to the distance covered by the vehicle and that enables units of distance to be measured on the recording tape by a measuring rule, a secondary driving means, a transferring means for transferring the drive of the tape feed mechanism from the primary driving means to the secondary driving means whenever the speed of travel sinks below a certain limit, an impressing needle for making impressions on the said recording tape, a speed indicator adapted to be driven by the primary driving means, an intermediate gear between the speed indicator and the impressing needle for moving the needle in accordance with the movements of the indicator, the secondary driving means being adapted to impart a measure of movement to the recording tape that enables the duration of the stops of the vehicle to be measured on the recording tape by a measuring rule to be measured with a measuring rule.

5. A device for recording the speed of travel of a vehicle comprising a cover with an observation opening extending as far as possible across its width, a recording tape behind the said opening, a tape feed mechanism for moving the tape, a primary driving means adapted to impart an amount of movement to the tape feed mechanism that is proportional to the distance covered by the vehicle, a clockwork adapted to be wound by the said primary driving means, a transferring means for transferring the drive of the tape feed mechanism from the primary driving means to the clockwork when the speed of travel sinks below a certain limit, an impressing needle for making impressions on the said recording tape, a speed indicator adapted to be driven by the primary driving means, an intermediate gear between the speed indicator and the impressing needle for moving the needle in accordance with the movements of the indicator, and two guide members for guiding the tape from one end to the other end of the said observation opening, whereby a considerable length of the said tape is exposed to view behind the said opening.

6. A device for recording the speed of travel of a vehicle comprising; a cover; a recording tape; a tape feed mechanism for moving the tape; a driving shaft for driving the tape feed mechanism; exchangeable gear wheels arranged outside the said cover; a loose coupling between the driving shaft and the exchangeable gear wheels; the said exchangeable gear wheels being adapted to impart an amount of movement to the tape feed mechanism through the driving shaft that is proportional to the distance covered by the vehicle; a clockwork adapted to be wound by the said driving shaft; a transferring means for transferring the drive of the tape feed mechanism from the driving shaft to the clockwork whenever the speed of travel sinks below a certain limit; an impressing needle for making impressions on the said recording tape; a speed indicator adapted to be driven by the said driving shaft; and intermediate gear between the speed indicator and the impressing needle for moving the needle in accordance with the movements of the indicator.

7. A device for recording the speed of travel of a vehicle comprising; a cover; a a plate holder; a detachable plate held by the plate holder; a tape, tape reels, and tape guide members mounted on the said detachable plate so as to enable them to be readily removed from the device; a tape feed mechanism for moving the said tape, a primary driving means adapted to impart an amount of movement to the tape feed mechanism that is proportional to the distance covered by the vehicle, a secondary driving means, a transferring means for transferring the drive of the tape feed mechanism from the primary driving means to the secondary driving means whenever the speed of travel sinks below a certain limit, an impressing needle for making impressions on the said recording tape, a speed indicator adapted to be driven by the primary driving means, and intermediate gear between the speed indicator and the impressing needle for moving the needle in accordance with the movements of the indicator.

8. In a device for recording the speed of travel of a vehicle, the combination with speed indicating mechanism, of a record strip progressing mechanism comprising means to directly and proportionately drive said strip according to the distance traversed, and trail mechanism wound from the continuous strip operating mechanism to pick up the driving of said strip when said indicating mechanism slows down below indicating speed, speed recording mechanism traversed across the strip by said indicating mechanism, means operated by the strip progressing mechanism for producing the recording movements of said speed recording mechanism after each traverse.

In testimony that I claim the foregoing as my invention I have signed my name in presence of two subscribing witnesses.

FRIEDRICH WILHELM GUSTAV BRUHN.

Witnesses:
  GEORG SCHATSKY,
  GUSTAV LINDHORST.